Feb. 10, 1953     H. LAMB     2,627,979
STRAINER MECHANISM FOR LIQUIDS
Filed Jan. 30, 1950     2 SHEETS—SHEET 1

HARRY LAMB
Inventor
By Smith & Tuck
Attorneys

Feb. 10, 1953 H. LAMB 2,627,979
STRAINER MECHANISM FOR LIQUIDS
Filed Jan. 30, 1950 2 SHEETS—SHEET 2
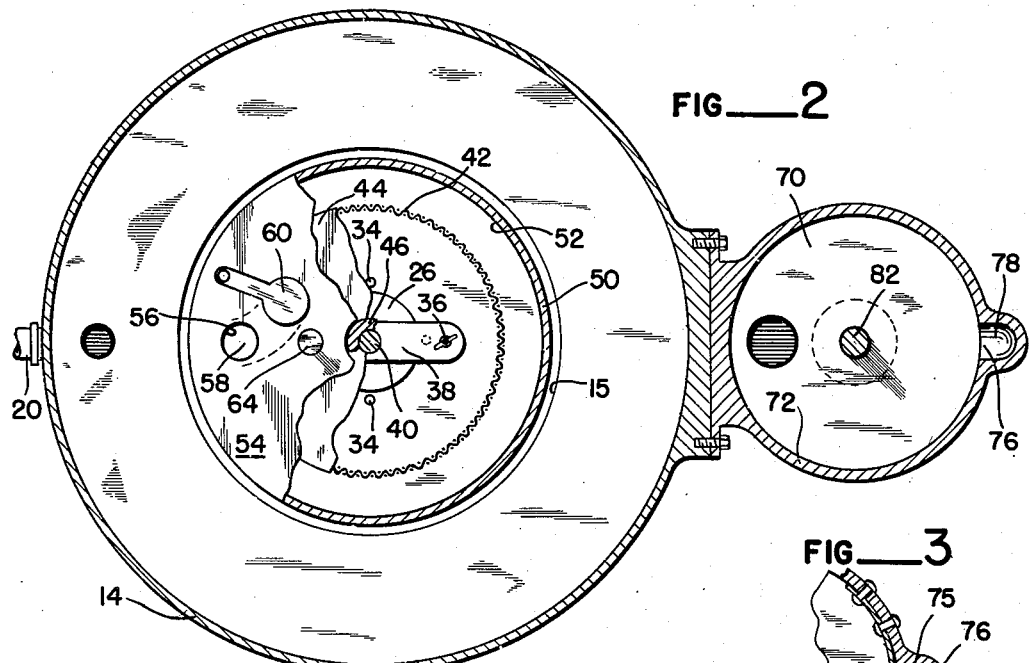
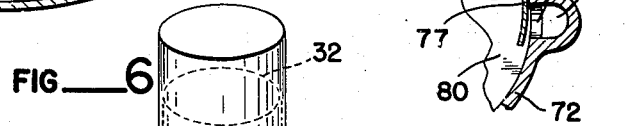
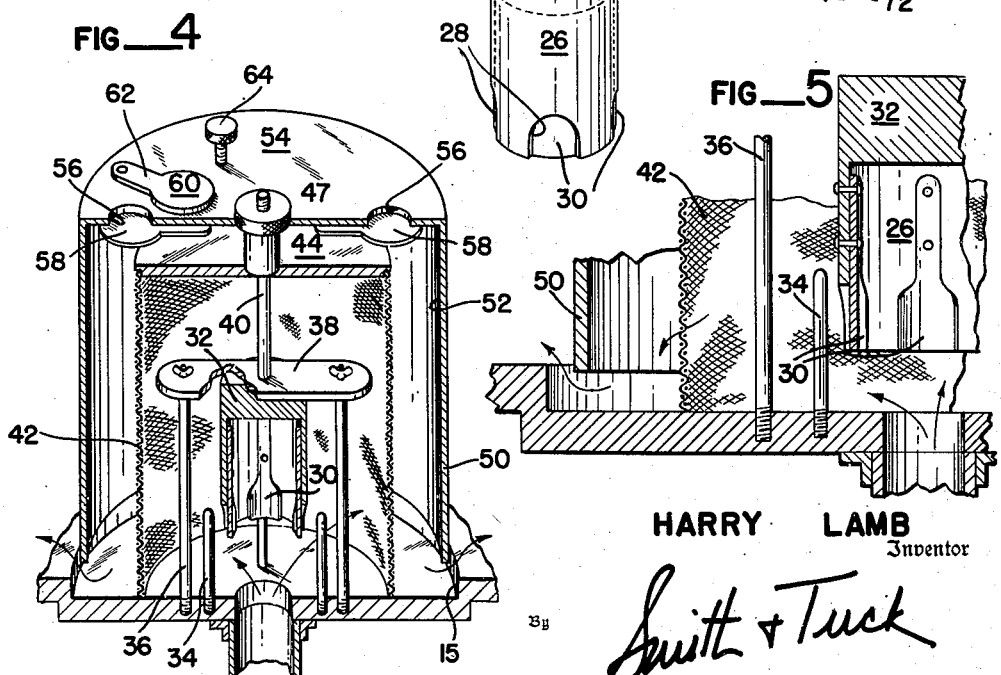
HARRY LAMB
Inventor
Smith & Tuck
Attorneys Patented Feb. 10, 1953

2,627,979

UNITED STATES PATENT OFFICE 2,627,979

STRAINER MECHANISM FOR LIQUIDS

Harry Lamb, Madison, Wis., assignor to
C. M. Ambrose Company, Seattle, Wash.

Application January 30, 1950, Serial No. 141,194

11 Claims. (Cl. 210—152)

This invention relates to a strainer mechanism for liquids and, more particularly, pertains to a means for straining paints and similar liquids.

For the purposes of exemplifying a typical use of this invention I shall describe it in connection with the paint industry, having always in mind that the invention may be otherwise employed to strain syrups or other materials in which there is sought a particle separation from a mass of fluid. My invention is therefore, to be viewed broadly and not limited to paint strainers.

In the production of paint, it is normal to subject a composition to a straining operation in order to remove particles of the oxides or small masses of improperly solubilized components which often exist in substantial quantities in a paint mixture. When the straining is accomplished through a screen, either horizontally or inclined, under the force of gravity it often occurs that the material to be removed lies on the screens, accumulates and slowly reduces the number of free passages of the strainer, or blocks the strainer and finally stops the operation. Various attempts have been made to solve the problem, but my considerable experience in the field has taught me that for one reason or another these attempts have been functionally impractical or economically unsatisfactory.

My solution to the problems as taught by this invention, has involved the general objects of straining liquids continuously throughout a normal work period, such as a day or a half day, without necessity of shutting down the operation to clean the strainer; to provide a constant-flow, constant-volume strainer; to provide for regular and effective screen flushing to clear the strainer of accumulated strained particles; to provide pressure to draw the liquids through the strainer in such a way as to avoid clogging of the strainer through lodgment of the particles being removed in the interstices of the strainer wall; to provide back pressures so that screen flushing is accomplished rapidly and physical dislodgment of accumulated particles is had; to provide mechanism that is relatively simple to construct, easy to assemble for use and disassemble for cleaning, and may be used for long periods without substantial wear and tear being applied to the strainer cloth of the mechanism.

These and other objects that will become more apparent hereafter are accomplished by the mechanism fully shown and described in the accompanying drawings, in which:

Figure 2 is a horizontal sectional view taken in the planes suggested by line 2—2 of Figure 1;

Figure 3 is a detail sectional view taken on line 3—3 of Figure 1;

Figure 4 is a sectionalized perspective view of the strainer element, and the enclosing and valving means employed therewith as it appears during screen flushing;

Figure 5 is an enlarged detail view illustrating the "backwash" and bonnet flushing operations of this mechanism; and Figure 6 is a perspective view of an inverted valve cup of my strainer.

Figure 1:
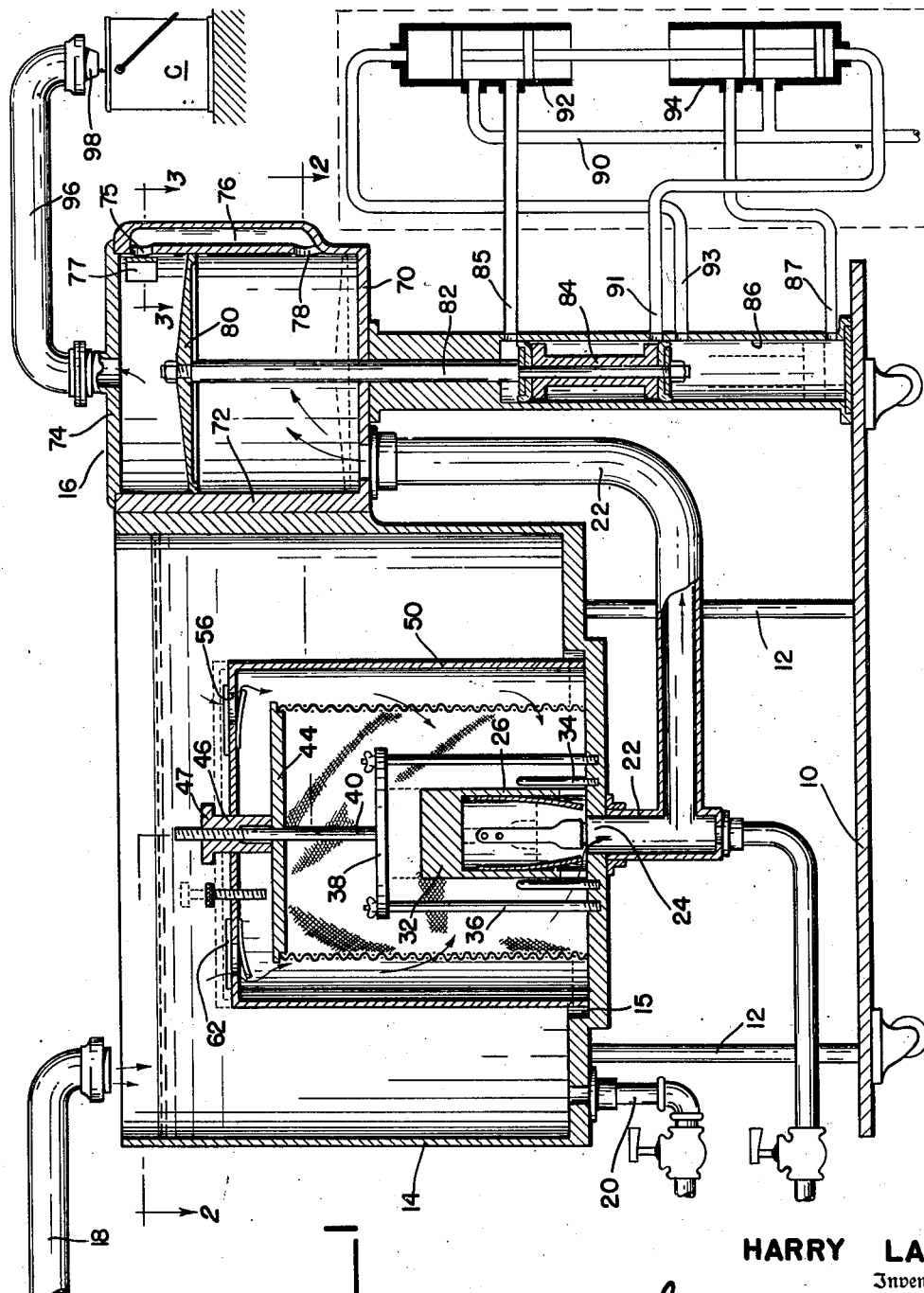
Figure 1 is a vertical sectional view in a plane that includes the axis of the strainer and pressure chamber components of my improved strainer mechanism as it appears when drawing fluid through the strainer element.

In the preferred form of my invention, I mount the mechanism for portability upon the castered base above which, on legs 12, is supported the fluid receptable 14 and the pumping mechanism 16. Fluid is supplied to the reservoir from a remote source through feed conduit 18 and may be drawn off through valve cock 20 or, as in the normal straining operation, through the conduit 22 extending from the outlet 24 in the floor of the reservoir. While reservoir 14 is shown with annular walls, it will be apparent that this shape is chosen for convenience of construction and that other shapes and dimensions will be equally useful.

Superimposed over outlet 24 is an inverted cup 26 that has a plurality of fluid passages 28 in its rim. Such passages are closed on the interior by flexible and displaceable valve blades 30. For purposes later to be described, cup 26 has a weight 32 in its upper end. On occasion, cup 26 is elevated by fluid pressure above the bottom of the reservoir and guide pins 34 are positioned in the reservoir floor about the cup to preclude its toppling or lateral displacement.

A bifurcated column comprising legs 36, cross head 38 and screw pin 40 is mounted in the reservoir astraddle cup 26. The cross head 38 serves to limit upward travel of the cup as indicated in Figure 4, but may easily be removed during cleaning of the mechanism in order to give access to the interior of the cup, and to permit flushing or scrubbing of the outlet 24 and conduit 22.

Particle separation is obtained by the upright foraminous screen 42 here shown as a cylindrical wall having an upper head 44 which is dropped over the pin 40. A hand nut 46 is threadedly engaged to pin 40 and bears on head 44 to hold the screen 42 tightly down onto the floor of the reservoir in the floor recess 15 formed therein. The floor of the reservoir surrounding recess 15 is only slightly raised, but the wall of the recess serves as a guiding means for the elevatable bonnet 50 that encloses the screen cylinder.

Bonnet 50 is an unidirectionally valved dome that surrounds the strainer mechanism and divides the reservoir into an outer and inner zone. Fluid is fed into a pool residing in the outer zone, and the same is drawn through the bonnet into the inner zone. The bonnet comprises the upright annular wall 52 and upper end head 54 and is preferably formed of sheet metal. At the axis of the head is an opening through which passes the nut 46 on which is the upper flange 47 that acts as a stop or abutment to limit upward travel of the elevatable bonnet. Passages 56 through the head 54 are controlled, and upward passage of fluid through them is precluded by flexible flap valves 58 mounted interiorly of the bonnet. On certain occasions the passages 56 may be blocked against the downward passage of fluid by means of the manually operable plugs 60 each of which is mounted on a pivot arm 62. Hand screw 64 passing through head 54 permits the manual elevation of the bonnet relative to the screenhead 44 when such is desired.

Assuming a condition wherein the reservoir is substantially filled with paint to be strained to a level above the top of the bonnet 50, and the interior of the bonnet is also filled, paint will to a certain extent pass through the screen with the particles separated, remaining between the bonnet and screen. A negative pressure is employed to draw the liquid through the screen in a continuous manner and such is applied to the conduit 22 which causes the flap valves 58 in the bonnet and flap valves 30 in the inverted cup 26 to swing open and permit the passage of liquid. Such negative pressure is had through the functioning of the pump mechanism 16.

The pump 16 in this instance, stands alongside the reservoir which supports it and includes a bottom wall 70, annular wall 72 and cover 74. Conduit 22 extends between outlet 24 of the reservoir and the bottom wall 70 of the pump. Between the lower portion of the pump chamber and its upper portion extends the by-pass 76 which has an opening 78 and 75 respectively in communication with the chamber. Upper opening 75 has a flap valve 77 mounted on the inner face of wall 72 to close it. The lower opening 78 is unobstructed. Piston 80 within the pump chamber includes piston rod 82 which is secured to the actuator piston 84 in lower chamber 86.

As piston 80 moves upward in its chamber, a suction is imparted on its lower side causing flap valve 77 to close off port 75 from communication with the space above the piston while at the same time flap valves 30 and 58 are sucked open permitting liquid to pass into the bonnet through the screen, and fill the conduit 22 as well as the chamber under the piston. When the piston reaches the top of its stroke, the direction of travel is reversed causing it to descend and force liquid out through by-pass 76 into the space above the piston. During the initial portion of this downward stroke, the flap valves 30 are closed and no back passage of liquid takes place into the reservoir. When the piston descends to below outlets 78 of the by-pass 76, positive pressure is applied to the liquid in conduit 22 and to the under side of the inverted cup 26. At such time, as the back pressure has built up to a point that it can overcome the weight of cup 26, the latter rises off the bottom of the reservoir and fluid escapes into the interior of the cylindrical screen 42, outward through the screen openings with a rush, and is applied to the bonnet causing it to lift, whereupon there is a flush of liquid out under the lower edge of the bonnet.

I have found that by properly proportioning the weight of the cup 26 to the size of the piston and its displacement, it is possible to apply a back pressure of about two pounds to the liquid under cup 26 before the same raises and the liquid escapes. Thus the escaping liquid has substantial pressure which acts upon all the liquid within the screen forcing a portion out over practically all of the screen surface to dislodge accumulated particles from the screen. Such particles tend to settle to the lower periphery of the screen inside the bonnet. As the bonnet is intermittently lifted, these settled accumulations are periodically flushed outward and away from the screen and the recess in which the screen and the bonnet are seated. Since these accumulations are urged out into the outer zone of the reservoir in its lower portion, and considerably below the level at which fluid normally enters the bonnet, they do not ordinarily re-contaminate the liquid to be strained and no longer present a straining problem during the regular operation of the mechanism.

The means for reciprocating actuator piston 84 in chamber 86 is shown schematically in Figure 1 and involves air supply line 90 connected with longitudinally aligned reciprocating valves 92 and 94 which operate together to automatically, in a well-known manner, alternately feed air under pressure to the opposite sides of piston 84. Reciprocating motion of piston 84 produces like motion of piston 80. In the Figure 1 showing of the valve arrangement, air is about to be supplied to the upper surface of piston 84 through inlet conduit 85. Air to be displaced from beneath the piston is exhausted through conduit 87. As piston 74 descends, the conduit 91 is eventually uncovered and air under pressure passes out of the chamber above piston 84 through conduit 91 to the lower valve 94, causing its shuttle to move upward resulting in the passage of air under pressure through conduit 87 to underneath piston 84. In the latter instance air above the piston is exhausted through passage 85. By reason of the reciprocation of the valves and of the piston 84, regular reciprocation is obtained of piston 80 to alternatively pump and back-pump fluid out of, and into the reservoir 14 for the purposes and in the manner set forth above.

Paint that has passed to the chamber over the piston 80 is exhausted therefrom for can-filling or other purposes through pipe 96 and nozzle 98. The can C is shown as a typical disposition of such effluent material.

Normally a screening or filtering operation is carried on in a continuous manner which includes the regular supply of fluid to the reservoir as other such fluid is withdrawn following straining. When the end of a run approaches, the liquid level falls to below the level of the elevated inlets of the bonnet 50 and, of course, vacuum created by the pumping mechanism would suck air through inlets 56. To permit continued screening and straining, the operator swings the plugs 60 to cover the inlet openings 56 and raises the bonnet slightly off the reservoir floor by downwardly extending screw 64. In such instance the small amount of fluid remaining in the reservoir will be drawn under the lower edge of the bonnet, screened in so far as is possible, and passed on out through the normal channels. Or it may be drawn out unscreened by the removal of the bonnet, and screen and cup 26 and disposed of as desired. It is preferable that all the mechanism be so arranged that it may easily be disassembled for cleansing, as is often customary in the paint business when a change of color of the material to be strained is contemplated or a different material is to be processed.

I claim:

1. A strainer mechanism for heavy liquids, comprising: means forming a reservoir having a lower medial outlet, a strainer element having upright foraminous walls immovably rising above the floor of said reservoir around said outlet, a weighted cup mounted over said outlet and enclosed within said strainer element and having a unidirectionally valved port permitting passage of liquids only from outside of said cup to said outlet, guide means for said cup guiding the same in vertical movement and said weighted cup being displaceable upwards by sufficient pressure of liquids within said cup, a reversely operable pump having a suction interval in which a measured amount of liquid is drawn through said strainer element, valved port and outlet having a non-withdrawal interval having one portion in which less than all of said measured quantity is discharged from said strainer mechanism and insufficient pressure is created within said cup to displace said cup and having a second portion in which undischarged liquid of said measured quantity is reversely fed back through said outlet with sufficient force to upwardly displace said cup and impart a "backwash" current upon the foraminous walls of the strainer element to dislodge accumulated unstrained matter that may have deposited thereon.

2. The combination according to claim 1 including a vertically movable bonnet rising above the reservoir floor about said strainer element and having an elevated inlet port unidirectionally-valved permitting fluid to flow therethrough into the bonnet interior from said reservoir.

3. The structure according to claim 1 in which the foraminous walls of the strainer element are vertical.

4. The structure according to claim 1 in which said reversely operable pump comprises a piston and a cylinder, said cylinder having an inlet end connected to said outlet and having a discharge end, said piston in moving toward said discharge end discharging liquids and drawing liquids from said reservoir through said outlet, said cylinder having a by-pass connecting opposite end portions thereof, said by-pass having a unidirectional valve permitting flow therethrough only when said piston is moving toward said inlet end, said by-pass being spaced from said inlet end of said cylinder whereby said piston in the last part of its path of travel toward said inlet end forces liquid out of said cylinder to said outlet, and reciprocal means for relative movement between said piston and said cylinder.

5. The structure according to claim 1 in which said reversely operable pump for drawing liquid comprises an expansible-contractible chamber adapted to partially discharge outward and partially return liquid to the reservoir during contraction, and means is included for expanding and contracting said chamber.

6. A strainer mechanism for heavy liquids, comprising: means forming a reservoir having a lower medial outlet, a weighted cup displaceably mounted over said outlet and including an unidirectionally-valved port for fluid from said reservoir to said outlet, a bifurcated column mounted in said reservoir astraddle said cup, in spaced relation about said port, a strainer cylinder having upright foraminous walls rising from the reservoir floor enclosing said cup and the column and anchored to the latter against upward movement, a vertically movable bonnet rising above the reservoir floor and enclosing said strainer cylinder and having an elevated inlet port unidirectionally valved to permit fluid to flow therethrough into the bonnet interior from said reservoir, guide and stop means supported by said cylinder to direct and limit vertical movement of said bonnet, and reversely operable means for drawing through said strainer element, valved ports, and outlet a measured quantity of fluid and for discharging less than all, said reversely operable means functionable during non-withdrawal intervals to reversely feed back undischarged fluid through said outlet to displace said cup and bonnet, and impart a "backwash" current upon the foraminous walls of the strainer cylinder to dislodge accumulated unstrained material that may have deposited thereon.

7. The structure according to claim 6 in which the reversely operable means for drawing fluid comprises an expansible-contractible chamber adapted to partially discharge outward and partially return fluid to the reservoir during contraction, and means is included for expanding and contracting said chamber.

8. The structure according to claim 6 in which the reversely operable means for drawing fluid comprises a piston-and-cylinder forming an expansible-contractible chamber, the chamber has an outlet intermediate its expanded and contracted conditions and is operatively connected with said outlet, and reciprocal means is provided for obtaining relative movement between said piston and cylinder.

9. The structure according to claim 6 in which extensible means is provided between the bonnet and strainer cylinder for elevating the bonnet on occasion above the reservoir floor.

10. The structure according to claim 6 in which the bonnet is cylindrical and the floor of the reservoir has a flat bottomed recess slightly larger in diameter than that of the bonnet and having the bonnet axially located therein.

11. The structure according to claim 6 in which there is provided valve means for sealing the elevated inlet port of the bonnet during such intervals as the bonnet is elevated above the reservoir floor, and extensible means is provided between the bonnet and the strainer cylinder for elevating the bonnet above the reservoir floor.

HARRY LAMB.

REFERENCES CITED

The following references are of record in the file of this patent:

UNITED STATES PATENTS

| Number | Name | Date |
| --- | --- | --- |
| 1,819,602 | Hughes | Aug. 18, 1931 |
| 2,338,417 | Forrest et al. | Jan. 4, 1944 |
| 2,338,418 | Forrest et al. | Jan. 4, 1944 |
| 2,338,419 | Forrest et al. | Jan. 4, 1944 |
| 2,526,656 | Goetz | Oct. 24, 1950 |